United States Patent [19]
Leonard

[11] 3,772,786
[45] Nov. 20, 1973

[54] APPARATUS FOR USE IN PROCESSING CURD IN THE MANUFACTURE OF CHEESE

[75] Inventor: Wilbur Valentine Leonard, Campbell St., Brighton, Victoria, Australia

[73] Assignee: Bell Bryant Pty. Ltd., Kensington, Victoria, Australia

[22] Filed: July 23, 1971

[21] Appl. No.: 165,687

[30] Foreign Application Priority Data
July 23, 1970 Australia.............................. 1958/70

[52] U.S. Cl.................................99/456, 31/89
[51] Int. Cl. ............................................ A01j 25/11
[58] Field of Search............................ 31/46, 48, 89

[56] References Cited
UNITED STATES PATENTS

| | | | |
|---|---|---|---|
| 3,167,862 | 2/1965 | Czulak................................ | 31/89 X |
| 3,554,765 | 1/1971 | Pontecorvo......................... | 31/46 X |
| 2,846,767 | 8/1958 | Hensgen et al. ..................... | 31/48 |
| 3,523,367 | 8/1970 | Czulak.................................. | 31/89 |
| 3,562,909 | 2/1971 | Nikolic ................................. | 31/46 |

*Primary Examiner*—Aldrich F. Medbery
*Attorney*—Cushman, Darby & Cushman

[57] ABSTRACT

A cheese curd processing machine in which curd is fed over a screen to a first conveyor on which it forms a layer, the conveyor being operated in use at a speed so as to form a layer of curd of convenient depth for whey drainage purposes, and the layer being stirred by means of a series of rakes which are moved in succession along its length from the infeed to the outfeed end thereof at a speed greater than the speed of the conveyor. Curd from the layer may then be transferred to a second conveyor, the effective speed of which is less than the speed of the first conveyor so that the depth of curd on the second conveyor is greater to facilitate consolidation during the second conveying stage.

5 Claims, 3 Drawing Figures

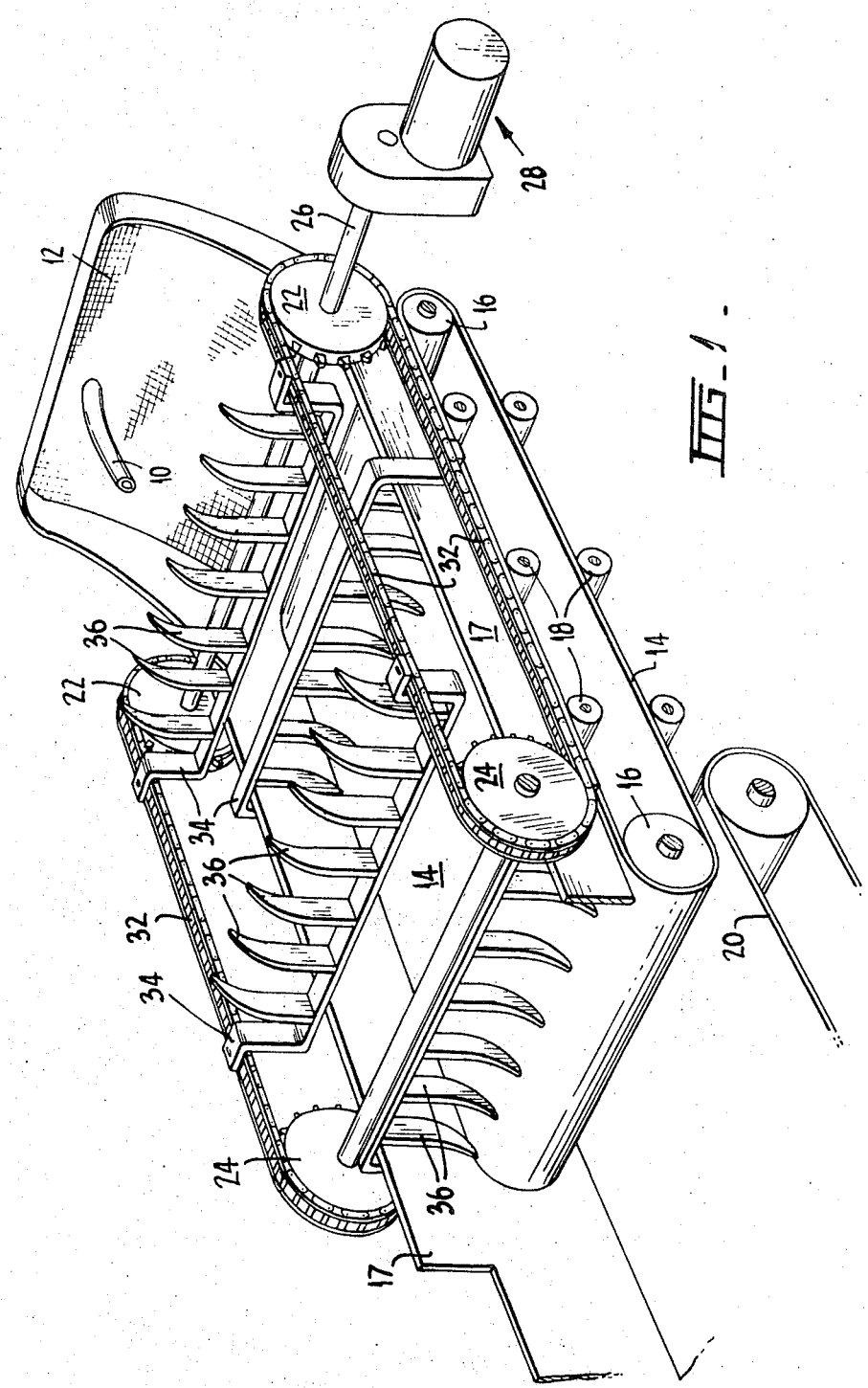

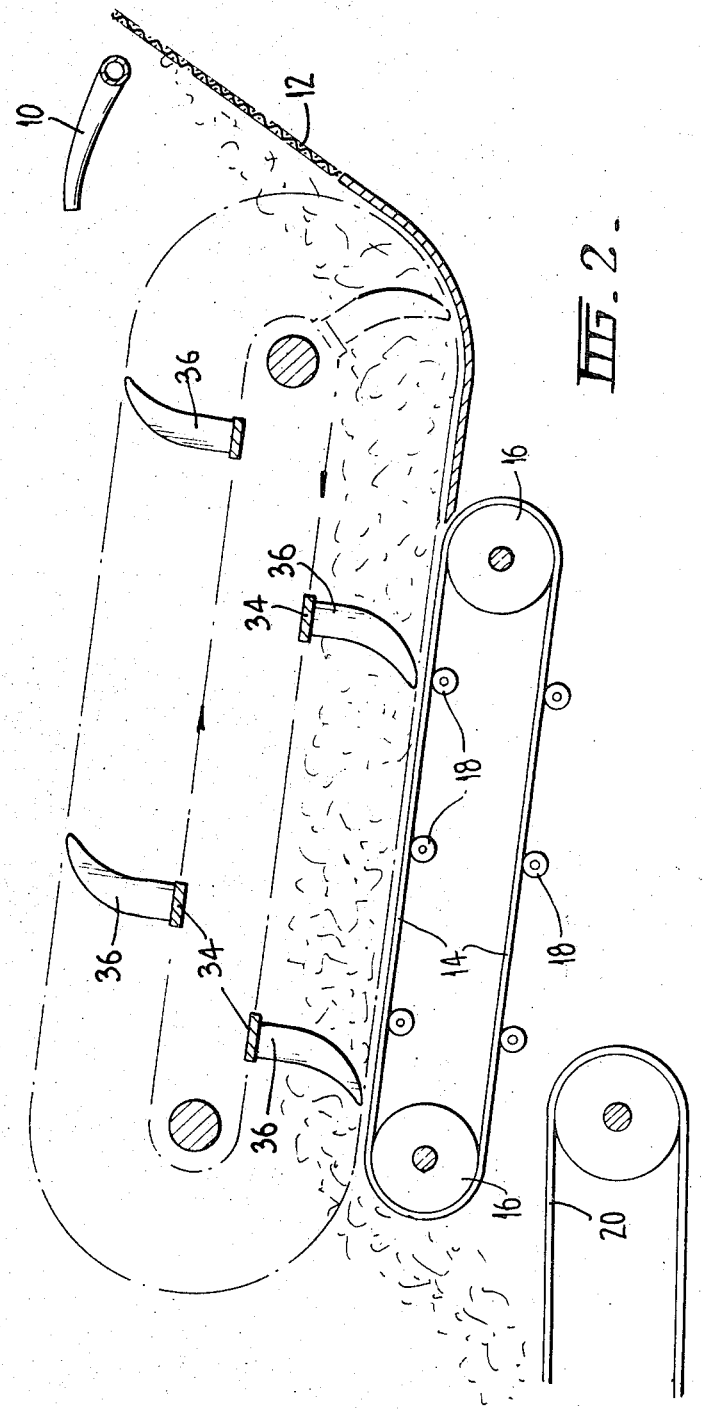

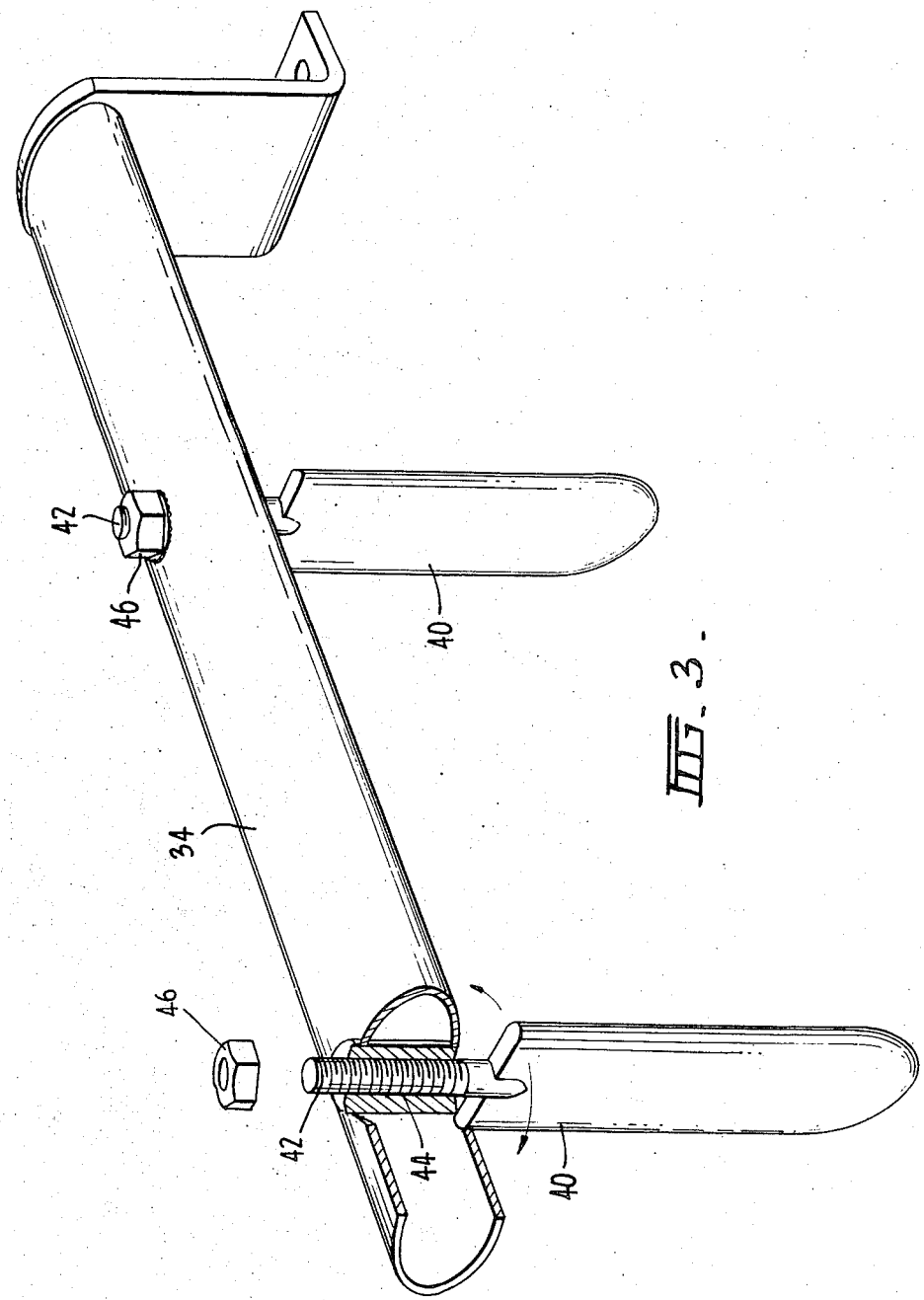

APPARATUS FOR USE IN PROCESSING CURD IN THE MANUFACTURE OF CHEESE

The present invention relates to a method and apparatus for use in processing of curd in the production of cheese. It is intended particularly but not exclusively for use in the manufacture of cheddar and like cheeses, in the production of which the curd is intended to consolidate.

In Australian Patent Application No. 26955/67 there is described a method and apparatus for draining whey from curd. Briefly the method disclosed therein comprised the steps of passing a mixture of curd and whey over a screen to effect an initial separation of the whey from the curd, passing the curd and remaining whey to a conveyor belt formed to cause or allow the whey to drain from the curd which forms a layer on the belt, and applying lifting forces to the curd on the conveyor belt to facilitate drainage of whey therefrom. The reader is referred to the appropriate specification for full details of the method.

The invention disclosed in Australian Application No. 26955/67 was intended particularly for use in production of Colby cheese, stirred curd cheese, and hard grating cheese of the Romano type. In such production, the layer of curd formed on the conveyor would be stirred along the full length of the conveyor and would not be permitted to consolidate thereon. However, the method and apparatus could also be used for production of Cheddar or like cheese by terminating the application of lifting forces at a comparatively early stage, and thereafter permitting the layer of curd to consolidate on the belt. Australian Patent Application No. 50076/69 describes a method and apparatus for producing cheese of the Cheddar type in which apparatus generally in accordance with Application 26955/67 is used to drain the curd, preparatory to separation of individual blocks from the consolidated layer of curd, and transfer of the blocks to a compression conveyor on which the curd in the blocks is caused to flow to produce fibre developement.

The drainage system described in Application No. 26955/67 has been found to give good results in production of Colby or Romano cheeses. It has also been found satisfactory in the production of Cheddar or like cheeses provided the layer of curd on the drainage conveyor is not too deep. In the production of Cheddar cheese, however, it is desired to make the layer of curd on the drainage conveyor of considerable depth so that consolidation of the lower part of the layer is obtained through gravity. When the layer of curd is made deep it has been found that the stirrers which apply the lifting forces to the curd constitute a considerable impedance to movement of curd with the conveyor, and cause banking of the layer of curd behind them. This can cause premature cheddaring of the curd while it still contains a considerable quantity of whey, and the whey may be trapped in the cheddared mass.

According to a first aspect of the present invention therefore there is provided apparatus for use in processing curd in the manufacture of cheese comprising first and second conveyor means arranged such that curd from a layer of curd formed on the first conveyor means can be transferred to the second conveyor means so as to form a body of curd thereon, the first and second conveyor means being operable at different effective speeds so that the depth of the layer on the first conveyor means can be made less than the depth of the body on the second conveyor means.

The arrangement may be such that the layer of curd formed on the first conveyor means is continuous with a layer formed on the second conveyor means. The first conveyor means is preferably operable at a speed such that the depth of the layer formed thereon permits a desired degree of drainage of liquid prior to transfer of the curd to the second conveyor means. Curd stirring means may be associated with the first conveyor means so as to facilitate drainage of liquid from a layer of curd formed on that conveyor means.

The depth of the body on the second conveyor means and the time for which it remains on this conveyor means may be made such as to obtain a desired degree of consolidation of the curd, for instance to permit further processing by a method as disclosed in Application No. 50076/69.

This aspect of the invention includes provision of a method for use in processing curd in the manufacture of cheese comprising the steps of forming a layer of curd on a first conveyor means, while operating said conveyor means at an effective speed such as to produce a desired depth of layer thereon, and transferring curd from said layer to a second conveyor means so as to form a body of curd thereon, while operating the second conveyor means at an effective speed such as to produce a depth of curd which is greater than the first mentioned depth.

Preferably the layer of curd on the first conveyor means is continuous with a layer formed on the second conveyor means. The depth of the layer on the first conveyor means is preferably such as to permit a desired degree of drainage of liquid prior to transfer of the curd to the second conveyor means. Preferably, the method includes the step of stirring the layer of curd on the first conveyor means to facilitate drainage of whey therefrom.

According to a second aspect of the invention there is provided apparatus for use in processing curd in manufacture of cheese comprising a conveyor arranged to convey a body of curd and a plurality of curd stirring devices movable in succession along an elongated path which extends along the conveyor in the direction of movement of the body of curd while extending into the body of curd to stir it. This aspect of the invention includes a corresponding method comprising the steps of forming a body of curd on a conveyor and stirring said body of curd by means of said devices.

Preferably the path extends forwardly of the conveyor from the infeed end thereof, and the path may be arranged to extend over substantially the full length of the conveyor. Preferably, too the speed of movement of the stirring devices along the path is greater than the speed of the curd in the same direction. Each stirring device may comprise a plurality of fingers spaced transversely of the path while being moved along it.

According to a feature of this second aspect of the invention, the conveyor for conveying the body of curd may be the first conveyor means referred to in the first aspect of the invention described above.

By way of example, one embodiment of an apparatus in accordance with the invention will now be described with reference to the accompanying drawings, in which:

FIG. 1 is a diagrammatic perspective view of the infeed end of a curd drainage and consolidation system, FIG. 2 is a diagrammatic side elevation of the apparatus shown in FIG. 1, and FIG. 3 is a perspective view of part of an arrangement of stirring blades alternative to the tine arrangement shown in FIGS. 1 and 2

The apparatus shown in the Figures is intended especially for production of Cheddar type cheese. In use of the illustrated apparatus, a curd/whey mixture is fed by a pipe, the end of which is indicated at 10 in the Figures, on to an inclined screen 12. The pipe is swivel mounted for oscillatory movement across the width of the screen so that the curd/whey mixture is spread evenly across it. Most of the whey passes through the screen into whey tanks disposed beneath the illustrated apparatus, while the curd forms a layer on the screen.

The lower end of screen 12 is curved to lead on to a first conveyor belt 14. The belt is similar to that disclosed in Application No. 26955/67, being constituted by a continuous band of polyethylene mounted on end rollers 16 and intermediate guide rollers 18. Stainless steel guide walls 17 are provided to maintain a curd layer of desired depth on the belt. As best seen in FIG. 2, the upper run of the belt is inclined upwardly at a small angle to the horizontal away from the end of screen 12. An angle of 9° is suitable.

It will be noted however that conveyor belt 14 is short in comparison with the conveyor belt described in Application 26955/67 and at the end of belt 14 remote from the screen the layer of curd is transferred to a further conveyor belt 20. This belt is also of similar construction to the belt described in Application 26955/67, the upper run of conveyor belt 20 is substantially horizontal in the longitudinal direction though crowned to the longitudinal centre line.

In use, conveyor belt 14 is driven by a suitable drive system (not shown) so that curd received from screen 12 forms a layer on the upper run of the belt and is conveyed thereby to belt 20. Belt 14 is driven at a speed such that for a given throughput of curd defined by the amount fed from pipe 10, a layer of curd of desired thickness is formed on the belt. The thickness of the layer will be such as to permit adequate drainage of whey while the curd is in a non-consolidated state. Conveyor belt 20 will be driven at a different speed such that the layer of curd on that belt is substantially deeper than the layer on belt 14. This, together with suitable choice of the length of belt 20, will permit consolidation of the layer on the conveyor belt by gravity, so that the curd leaving this conveyor can be treated by the subsequent processing steps described in Application No. 50076/69.

Disposed above belt 14 is a curd stirring apparatus comprising two pairs of sprockets 22 and 24 respectively. Sprockets 22 are mounted on and for rotation with a shaft 26 carried on the frame of the machine above the lower end of screen 12. Shaft 26 is in use driven by a motor and gear arrangement diagrammatically indicated at 28. Sprockets 24 are mounted on and for rotation with a shaft 30 carried in the machine frame above the other end of belt 14; they are interconnected with sprockets 22 by respective chains 32. In use, chains 32 are driven in the opposite sense to belt 14 so that the upper run of the belt and the lower run of the chains travel in the same direction.

Four crossbars 34 are mounted between chains 32 so as to be equally spaced along the path of travel defined by the chains. Each crossbar carries a plurality of tines 36 which project downwardly from their bar when it is moving along the lower run of the chains so that the tines then extend into the layer of curd on belt 14. The speed of travel of the chains is made greater than the speed of travel of the belt, so that the tines move through the layer of curd and form channels in it. The successive sets of tines are staggered so that the channels formed by one set fall between the channels formed by the preceding set.

As can be seen in FIG. 2, as the tines rotate from the upper run to the lower run of the chains, they enter the curd falling from the screen 12 on to the belt 14. They then progress through the layer of curd formed on the conveyor, and the channels opened up by this movement permit run-off of whey from the layer back towards the screen; this is facilitated by the inclination of belt 14. The speed of operation of the chains relative to belt 14 can be adjusted to give a very gentle stirring action which nevertheless permits the required run-off of whey. It will be noticed that since the stirring tines move in the same direction as the curd along belt 14, there will be no tendency for curd to bank up behind the tines and therefore no tendency for premature cheddaring to occur. Also, it will be noticed that at this stage belt 14 is being operated at a speed such that the layer formed on it is comparatively shallow, and therefore very effective drainage can be obtained.

In a machine designed to process 6,000 lbs of curd per hour, for production of Cheddar cheese, the width of belt 14 may be about 4 ft. 8 inches, and equal to the width of belt 20. In this case, six to eight stirring fingers may be provided on each crossbar with approximately even spacing between adjacent fingers. Belt 14 may have an upper run about 10 feet long and may be run at a linear speed of 1 foot per minute to produce a curd depth of about 6 inches. The chain speed may then be about 30 feet per minute. Belt 20 may have an upper run such that the curd travels about 18 feet, and may be run at a linear speed of about 6 inches per minute to produce a curd depth of about 12 inches. The belt speeds would be adjustable to permit variation of curd throughput.

The illustrated embodiment is advantageous in that it is now possible to adjust the depth of the curd layer during stirring so that drainage is facilitated, while subsequently operating with a greater depth of curd so that consolidation is facilitated. The stirring arrangement assists rather than impedes the movement of the curd, and the formation of channels along whch whey can run is preferred to simple lifting of the curd. The action of the stirrer can be made much more gentle than before and this reduces fat losses and losses of fines due to particle dmaage. The chains and sprockets can be located completely outside the confines of the belt so that the chain drive does not approach the curd layer.

The same apparatus can be used for production of stirred curd or hard grating cheese, and in this case belts 14 and 20 can be operated at the same speed. Curd agitators of known type can be mounted over belt 20 primarily for use in production of this type of cheese. These additional agitators can be rendered ineffective during production of Cheddar type cheese.

FIG. 3 illustrates an alternative form of stirring finger which can also be used in conjunction with crossbar 34. Each of the alternative fingers comprises a blade-like portion 40 and a screw-threaded shank 42 extending away therefrom. Each finger is mounted on the crossbar by co-operation of its shank 42 with a respective screw threaded boss 44 mounted in the crossbar. Each finger is locked with its blade at a desired angle relative to the direction of movement of the crossbar by means of a respective lock nut 46.

The angle of each blade to its direction of movement is chosen in accordance with the degree of distrubance it is desired to impart to the curd — the greater the angle, the greater the disturbance. The desired degree of disturbance in turn depends upon the required final mosture content and the characteristics of the curd fed to the machine. The latter may vary seasonally. Usually the blades are set at about 45, to their direction of movement and required adjustments are made from this "norm." The speed of the chains and crossbars can also be adjusted to vary the disturbance imparted to the curd. The angles of the blades on successive crossbars 34 would be opposed so that curd moved by one set of blades would be returned by the succeeding set. There may be a degree of variation in the angles of the blades carried by any one crossbar if this is found necessary to prevent build up of curd on any particular line along the conveyor.

The invention is not limited to details of the embodiment illustrated in the drawings. The chain speed may be variable to permit adjustment of the amount of stirring obtained, a slower speed giving a more gentle stirring action. The illustrated form of stirrer may be used in other conveyor arrangements, and may also be used as an additional curd agitator in association with belt 20 during production of Colby cheese. If this stirrer is used with a single conveyor belt, an initial portion of the upper run of the belt may be inclined upwardly to assist run-off whey and the stirrer may be disposed above this portion of the belt. The remainder of the upper run can then be substantially horizontal. The degree of inclination of the belt 14 and the inclined portion of the belt in this latter variation can be made adjustable. The stirrer itself is not limited to the particular forms illustrated in the drawings. Any suitable number of stirring fingers may be provided in each set and any suitable number of sets may be used. Also, arrangements may be made to oscillate the crossbars, or the fingers carried thereby, as the chains move forwardly along the conveyor, but it is believed that this added complication does not significantly improve the effect obtained without oscillation.

The present invention may be used in a process, and in conjunction with apparatus, as described in United Kingdom Patent No. 1243957 . However, it is not limited to use in that context. Australian Application No. 26,955/67 referred to herein corresponds with U.S. Pat. No. 3,523,367 (filed 6th Sept., 1968). United Kingdom Patent No. 1243957 corresponds with U.S. Patent Application No. 6915 (filed 29th Jan. 1971).

The second aspect of the invention is not limited to production of a layer of curd which is continuous from the infeed to the outfeed end of the system. The curd on the second conveyor may not be formed into a layer at all, but into a succession of heaps spaced along the conveyor. This may be advantageous in permitting improved run-off of whey formed during the consolidation stage of the process. In this case, the second conveyor could be operated intermittently and the "speed" of the conveyor must be considered in terms of the effective speed at which the curd is conveyed over a period, rather than the actual speed at which the conveyor moves when it is operative.

Also, the second conveyor may not be in the form of a continuous belt. If the curd is to be conveyed, at this second stage, as a succession of separate bodies, those bodies could be carried in separate containers. Hence the second conveyor could be in the form of a plurality of buckets conveyable in succession around a closed path and receiving curd from the first conveyor.

I claim:

1. Apparatus for use in processing curd in the manufacture of cheese comprising: a first conveyor arranged to convey a body of curd, and a plurality of curd sitting devices movable in succession along an elongated path which extends along the conveyor in the direction of movement of the body of curd, each of said devices extending toward the conveyor when each of said devices extend into the body of curd to stir it while moving along said path, said path extends forwardly of the first conveyor from an infeed end thereof, the speed of movement of each of said devices along said path is different than the speed of the curd in the same direction; and each of said devices includes a plurality of fingers spaced transversely of said path while being moved along it.

2. Apparatus as defined in claim 1 wherein the speed of movement of each of said devices along said path is greater than the speed of the curd in the same direction.

3. Apparatus as defined in claim 1 further comprising a second conveyor means arranged such that curd from a layer of curd formed on the first conveyor can be transferred to the second conveyor means so as to form a body of curd thereon, the first conveyor and the second conveyor means being operable at different effective speeds so that the depth of the layer on the first conveyor can be made less than the depth of the body on the second conveyor means.

4. Apparatus as claimed in claim 3 wherein the layer of curd formed on the first conveyor is continuous with a layer formed on the second conveyor means.

5. Apparatus as claimed in claim 3 wherein each of said devices are provided to stir the curd on the first conveyor so as to facilitate drainage of liquid therefrom.

* * * * *